Patented Feb. 9, 1932

1,844,396

UNITED STATES PATENT OFFICE

HANS KÄMMERER, OF MANNHEIM, AND KARL HOLZACH, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

MANUFACTURE OF DYESTUFFS CONTAINING CHROMIUM

No drawing. Application filed July 24, 1926, Serial No. 124,776, and in Germany August 6, 1925.

Various processes for the manufacture of dyestuffs containing chromium and having valuable properties are known, for example those described in the U. S. Patents 1,090,123, 1,264,604 and others.

We have now found that the manufacture of such dyestuffs can be carried out with particular advantage by acting with a chromium compound on a dyestuff capable of being chromed at an elevated temperature at which no decomposition of the dyestuff occurs and under pressure. Thereby the time of heating necessary for the formation of the chromium compounds of the dyestuffs is considerably reduced. In the claims as hereunto appended the term "naphthol" is used in a broad sense including also naphthols containing other substituents and in particular sulfonic acid groups.

It is often advantageous to subject the dyestuffs containing chromium so obtained to a subsequent treatment with alkaline agents in the manner described in the German Patent 419825.

The following examples will further illustrate how our invention may be carried out in practice, but the invention is not limited to these examples. The parts are by weight.

Example 1

100 parts of the azo dyestuff obtainable from diazotized 1-amino-2-naphthol-4-sulfonic acid and beta-naphthol, 60 parts of chromium formate containing about 30 per cent of $Cr_2O_3$ and 1000 parts of water are heated for 2 hours to 105° C. in an autoclave. The dyestuff containing chromium is precipitated by an addition of common salt and sucked off, whereupon the resulting paste is boiled with caustic soda lye of 4° Bé. The solution is filtered, the soda lye is partly neutralized by means of hydrochloric acid, saturated with common salt and the precipitate is sucked off. The dyestuff so obtained dyes wool pure blue shades of very good fastness.

Example 2

100 parts of chromoxane blue R (see Schultz, Farbstofftabellen, 5th edition, page 379) are heated in an autoclave for an hour to 120° C. with 400 parts of a chromium formate solution containing 5 per cent of $Cr_2O_3$, whereupon the solution is evaporated to dryness. The blue dyestuff so obtained can be fixed on fibres in the manner described in the British Patents 7892 and 26460 of 1912 or when made into a color lake in the usual manner it may be used for example as a paste color for wall-papers.

Example 3

100 parts of the dyestuff obtainable from diazotized 4-nitro-2-amino-phenol and 2-phenylamino-8-naphthol-6-sulfonic acid are heated in an autoclave for 2 hours to 110° C. with an alkaline chromium glycerol solution prepared according to Example 1 of the German Patent 366,095 and containing 17 parts of $Cr_2O_3$. The resulting dyestuff is sucked off and dried. It dyes wool dark brown shades of excellent fastness.

We claim:

1. In the production of chromium compounds of o-hydroxy-azo dyestuffs obtainable from an o-hydroxy-diazo compound with a napthol, the step which comprises heating an o-hydroxy-azo-dyestuff of the said kind with a chromium compound capable of reacting therewith, in a closed vessel at a temperature sufficiently above 100° C. to produce superatmospheric pressure, but below the temperature at which the dyestuff is destroyed.

2. In the production of chromium compounds of o-hydroxy-azo dyestuffs obtainable from an o-hydroxy-diazo compound with a naphthol, the step which comprises heating an o-hydroxy-azo dyestuff of the said kind with a chromium compound capable of reacting therewith, in a closed vessel at a temperature between 105 and 120° C.

3. The process of producing a chromiferous o-hydroxy-azo dyestuff which comprises heating the o-hydroxy-azo dyestuff obtainable from diazotized 1-amino-2-naphthol-4-sulphonic acid and beta-naphthol with a chromium formate solution in a closed vessel at 105° C.

4. The process of producing a chromiferous o-hydroxy-azo dyestuff which comprises heating the o-hydroxy-azo dyestuff obtainable from diazotized 4-nitro-2-aminophenol and 2-phenyl-amino-8-naphthol-6-sulphonic acid with an alkaline chromium glycerol solution in a closed vessel at 110° C.

In testimony whereof we have hereunto set our hands.

HANS KÄMMERER.
KARL HOLZACH.